(12) United States Patent
Schonlau et al.

(10) Patent No.: US 6,898,995 B1
(45) Date of Patent: May 31, 2005

(54) ACTUATION DEVICE FOR A MOTOR VEHICLE

(75) Inventors: Jürgen Schonlau, Walluf (DE); Hans-Jörg Feigel, Rosbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/018,450

(22) PCT Filed: May 26, 2000

(86) PCT No.: PCT/EP00/04802

§ 371 (c)(1), (2), (4) Date: Apr. 17, 2002

(87) PCT Pub. No.: WO00/78583

PCT Pub. Date: Dec. 28, 2000

(30) Foreign Application Priority Data

Jun. 17, 1999 (DE) .......................... 199 27 775
Aug. 5, 1999 (DE) .......................... 199 36 937
Nov. 4, 1999 (DE) .......................... 199 53 002

(51) Int. Cl.$^7$ ................................................. G05G 1/14
(52) U.S. Cl. ........................................ 74/560; 74/512
(58) Field of Search .......................... 74/512, 513, 560

(56) References Cited

U.S. PATENT DOCUMENTS

| | | | | |
|---|---|---|---|---|
| 3,721,309 A | * | 3/1973 | Donaldson .................... | 74/513 |
| 5,890,399 A | * | 4/1999 | Rixon et al. .................. | 74/512 |
| 5,916,330 A | * | 6/1999 | Jacobson ..................... | 74/512 |
| 5,996,438 A | * | 12/1999 | Elton ......................... | 74/512 |
| 6,082,219 A | * | 7/2000 | Wolpert ....................... | 74/512 |
| 6,305,239 B1 | * | 10/2001 | Johansson et al. ............. | 74/512 |

FOREIGN PATENT DOCUMENTS

| | | | | |
|---|---|---|---|---|
| DE | 1087475 | | 8/1960 | |
| DE | 2841988 | | 4/1980 | |
| DE | 3107918 A1 | * | 9/1982 | ............. F15B/9/12 |
| DE | 3413030 | | 10/1985 | |
| DE | 3431360 | | 3/1986 | |
| DE | 3904616 | | 8/1989 | |
| DE | 9307274 | | 9/1993 | |
| DE | 4335511 | | 5/1994 | |
| DE | 94044295 | | 9/1994 | |
| DE | 4409235 | | 10/1994 | |
| DE | 4415642 | | 12/1994 | |
| DE | 19533235 | | 3/1997 | |
| DE | 19617372 | | 1/1998 | |
| DE | 19706692 C1 | * | 6/1998 | ........... B60K/23/00 |
| EP | 62268 A1 | * | 10/1982 | ........... B60T/13/52 |
| GB | 920 784 | | 3/1963 | |
| GB | 2055180 A | * | 2/1981 | ............. G05G/7/04 |
| GB | 2075926 | | 11/1981 | |

OTHER PUBLICATIONS

International Examination Report for Application PCT/EP00/04802.

* cited by examiner

*Primary Examiner*—David A. Bucci
*Assistant Examiner*—Timothy McAnulty
(74) *Attorney, Agent, or Firm*—Honigman Miller Schwartz and Cohn LLP

(57) ABSTRACT

The present invention relates to an actuation device for a motor vehicle, including a pedal stand that can be mounted on the vehicle and has articulated to it a base member that is swivelling about a first axis and fixable by means of an adjustment device, comprising a housing for a hydraulic or electromechanic generator that points into a vehicle interior in opposition to a direction of actuation, and a pedal lever which is pivoted at the base member and includes two legs, wherein foot pressure is applicable to the first leg, and the second leg acts on the generator. The device permits a simple adjustment of the actuation device to adapt to the comfort requirements of different drivers with different body lengths (leg lengths) and further has an optimized collision performance. Finally, it is favorable that hydraulic generators may also be arranged in the interior of the vehicle.

8 Claims, 3 Drawing Sheets

ACTUATION DEVICE FOR A MOTOR VEHICLE

TECHNICAL FIELD

The present invention related to an actuation device for a motor vehicle.

BACKGROUND OF THE INVENTION

Actuation devices are principally known in the art, especially as the actuation of clutches, and they must satisfy most different requirements. On the one hand, it is imperative for the device to need only little mounting space because the space requirement of this assembly reduces the space that can be used for passengers in the vehicle interior. What is also detrimental to the space available is the steering column that must be passed through a body wall in the area of the point of attachment for a pedal stand. In addition, there are many transverse reinforcements in this area which extend in the way of a horizontally extending support member from one vehicle side to the other vehicle side and thereby reinforce the vehicle compartment.

Because the actuation device has to satisfy the comfort requirements of various operators, the adjustability and adaptability of the pedal lever position to different drivers of different heights, especially buttock-to-ankle length, is absolutely necessary.

Also, the actuation device must comply with safety requirements, i.e., it must have a favorable collision performance. In view of the above, a large number of most different concepts have become known to withdraw the pedal lever actively from the operator in the case of a crash. The different approaches available eliminate the above-mentioned problems only in part. Thus, e.g. solutions for swivelling a pedal assembly comprised of master brake cylinder and brake force booster in the case of a crash are not appropriate for the adjustability of the pedal lever position.

In addition, it is a basic need to procure the actuation device from a supplier as an independent unit, quasi isolated from the other vehicle components, to easily mount it onto the vehicle, and to transfer the same solution to other vehicle types. DE 196 17 372 A1 discloses a pedal assembly wherein in the case of a crash a pyrotechnical propellant is ignited, and the gas pressure thereof drives a piston device so that a pedal lever articulation arrangement is released by means of a locking element. A device of this type necessitates a crash sensor and an electronic control unit which sends an ignition signal to the propellant. The employment of pyrotechnical components in a vehicle requires special safety provisions even during the assembly at the vehicle maker's premises because erroneous activations must be avoided in any case at any time.

SUMMARY OF THE INVENTION

An object of the present invention is to provide an actuation device which overcomes all above-mentioned problems and, in addition, permits being integrated into different vehicle types at low cost, without the necessity of special safety provisions for the prevention of malfunctions.

This object is achieved by an actuation device for a motor vehicle, including a pedal stand that can be mounted on the vehicle and has articulated to it a base member that is swivelling about a first axis and fixable by means of an adjustment device, comprising a housing for a hydraulic or electromechanic generator that points into a vehicle interior in opposition to a direction of actuation, and a pedal lever which is pivoted at the base member and includes two legs wherein foot pressure is applicable to the first leg, and the second leg acts on the generator.

This object is also achieved by an actuation device for a motor vehicle including a pedal stand that can be mounted on the vehicle, and a base member that is swivelling about an imaginary axis and articulated to the pedal stand by way of bearing means, and an adjustment device which is spaced from the axis between the pedal stand and the base member, wherein the articulation of the base member at the pedal stand can be released so that the base member along with at least one pedal lever articulated thereat is mounted at the pedal stand so as to be swivelling about another axis.

DETAILED DESCRIPTION OF THE DRAWINGS

Figure 1:
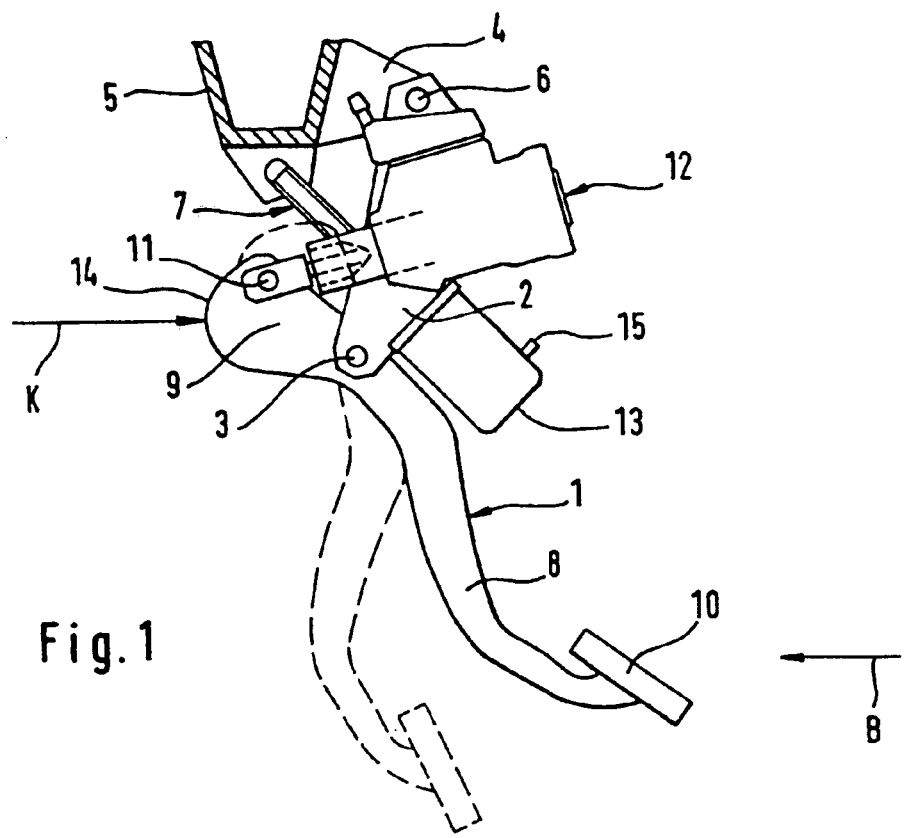
FIGS. 1 and 2 show an embodiment of a first actuation device in the maximum front adjustment position and in the maximum rear adjustment position with respect to an operator (not shown), and the actuation end position is shown in dotted lines in each case.
Figure 2:
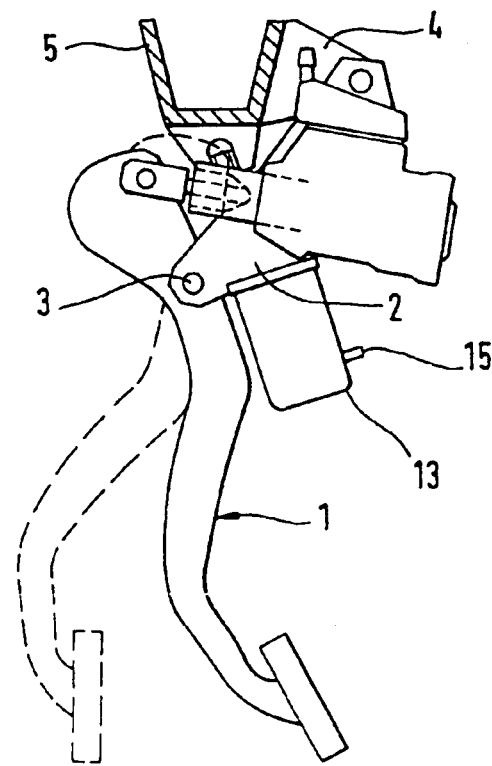

The actuation device as shown in FIGS. 1 and 2 has a two-leg pedal lever 1 which is articulated swivellingly at a base member 2 by means of a bolt 3 acting as an axis. Foot pressure can be applied to the first leg 8 of the pedal lever 1, and the second lever 9 acts on a (preferably hydraulic) generator 12, formed fast with the base member, for a hydraulic booster, master brake cylinder, or electromechanic generator 12 for an electromechanic brake device.

The base member 2 is pivoted to a pedal stand 4 which can be secured to a component part 5 formed fast with a vehicle, i.e., a wall, a mounting support, or a similar member. For reasons of standardization, the swing joint between the pedal stand 4 and the base member 2 is preferably effected also by means of a bolt 6, however, any type of swivel joint is principally feasible.

An adjustment device 7 including a threaded spindle-and-nut arrangement is interposed between the pedal stand 4 and the base member 2 in order to permit a, precisely regulatable adjustment of the actuation device to different persons, as will be explained hereinbelow. The base member 2 along with the pedal lever 1 is swivelling in relation to the pedal stand 4. Further, a purely mechanically active torque transmission or torque deviation means in the shape of a lever is provided and deviates a force K, that does not act in the direction of actuation on the actuation device, into an actuating force in the actuation direction B, and wherein a swivelling movement of the pedal lever 1 is produced with the lever-shaped torque-transmission or torque deviation means.

In the figures, a force K opposed to the direction of actuation B is characterised, the cause of which force is e.g. a component part which enters into the vehicle compartment due to an accident, or a drive unit similar element which is displaced due to the accident. Further, the pedal lever 1 is provided as a torque transmission means and, starting from a pedal lever pivot axis that is pivoted at a base member 2, includes two legs 8, 9 which point in different directions and are opposite each other according to the embodiment. There is provision of a foot plate (pad) 10 at one end of the first leg, and at an end of the second leg there is a point of articulation 11 for an actuating member (push rod, linkage, Bowden cable) of a generator 12, especially a hydraulic generator cylinder, master brake cylinder, electric generator with force simulation, or similar elements. The generator 12 along with the pedal lever 1 is arranged at the base member 2 which, in turn, is pivoted on the pedal stand 4. Thus, pedal lever 1 and generator 12 are jointly swivelling in relation to the pedal stand 4. The position of the pedal lever 1 relative to the generator 12 is consequently unaffected during the displacement movement.

A controlled adjustment of the base member 2 can be achieved by means of a preferably motor-driven threaded-spindle-and-nut arrangement or by means of any other type of gear, for example, a worm gear. Another characteristic of the gear employed is that it is self-locking gear, that means, a position that is adjusted is maintained also in the non-driven condition, without separate locking means. For a special clearance-free locking of the adjustment position it is favorable when the gear is positioned as close as possible to the base member 2 or the pedal stand 4 of the actuation device, without the intermediary of further transmission parts.

An electric motor 13 is flanged to the base member 2 as a drive unit for the adjustment device 7 according to the embodiment. The electric motor 13 drives a threaded spindle or worm, and these structural elements are preferably arranged at one end of a motor shaft integral therewith. However, it is also possible to couple the motor shaft with the mentioned spindle or worm without departing from the spirit of the present invention.

The rotatory spindle or worm movement causes an axial displacement of a type of nut which is mounted on the pedal stand 4. Thus, the adjustment device 7 permits a variation of the relative distance between base member 2 and pedal bock 4. The electric motor 13 swivels together with the base member 2 so that the nut that cooperates with the spindle or worm is mounted swivellingly on the pedal stand 4 corresponding to the adjustment position. It is obvious that a connection to the electrical wiring system is provided (not shown in the Figure) for the energy supply of the electric motor 13, and that the energization can be interrupted by means of appropriate switching means.

Further, it can be favorable to connect the electric motor 13 to an electric control unit with a memory module unit by means of a data bus link 15 and by using the CAN protocol. In this respect, the memory module unit permits having on hand determined adjustment data of the actuation device, especially related to passengers, subject to recall. A bus link 15 with other electrified adjustment devices, such as a seat adjustment, a steering wheel adjustment, a mirror adjustment, or with adjustment devices of other pedal levers of a pedal assembly (which e.g. comprises a brake pedal, an engine control pedal, and, possibly, a clutch pedal) permits storing defined positions of further adjustment devices centrally in a joint memory module unit and calling the data upon request, for example, by means of a defined code, so that the adjustment devices will favorably adopt the desired position simultaneously.

The effort and structure in the electrical system and also the cost of assembly is effectively reduced when the control unit and also the memory module unit is a part of an electric control unit of an electronically controlled vehicle brake system. It is furthermore advantageous that an actuation sensor which is connected to the control unit is associated with the pedal lever 1. The sensor allows a polling with respect to the pedal actuation condition. Because a polling of the actuation status is permanently executed by means of an algorithm that is implemented into the control unit, this renders possible locking the adjustment function for the case of a pedal actuation. In other words, the control unit does not send any adjustment signals to the electric motor 13, or interrupts the motor's energization, in the presence of a case of actuation.

It is equally possible to provide a crank handle or a hand wheel as a drive, which introduce the necessary adjustment movements into the gear arranged close to the pedal by means of appropriate adjustment means, for example, a flexible shaft. The flexible shaft consequently permits arranging the crank handle, wheel, or similar element, at a space outside the leg room which is better accessible to the driver.

The actuation device is designed so that, in the event of a crash with deformations of the front part of the vehicle, a force K that does not act in the actuation direction B on the device is deviated into the actuation direction B, and a swivelling movement in the actuation direction is brought about with the help of the pedal lever 1 as a torque transmission means. Along with the swivelling movement occurs a brake actuation independent of the driver which will instantaneously bring a vehicle to a standstill which is still rolling, wobbling, skidding, or out of control in any other manner. Thus, the additional advantage that ensues from the present invention is that the risk for uninvolved road users is reduced by minimizing the risk of a consequential accident because a self-braking effect takes place.

As is shown in the FIG. 1 embodiment, the force K acts without reversal of direction directly on the generator 12 which is arranged with an actuating rod and an actuating piston and a housing in opposition to the actuation direction B. This means with respect to the first lever arm 8 that a torque transmission takes place inasmuch as the lever arm is entrained in the actuation direction B, i.e., is withdrawn from the foot area, which reduces the risk of injury. In order that the second lever arm 9 comes into contact with a component part that enters into the passenger compartment earlier than the first lever arm 8 does and transmits the force K to the generator 12, a thickened baffle head 14 is arranged at the second lever arm 9.

The embodiments of FIGS. 1 and 2 illustrate the respectively non-actuated pedal lever position, and the maximum tilting of the pedal lever under maximum actuating force is shown in dotted lines. FIG. 1 relates to the rear adjustment position (close to the seat) which is typically chosen by vehicle occupants with a short body length, and FIG. 2 relates to a front adjustment position for vehicle occupants with a large body length.

Figure 3:
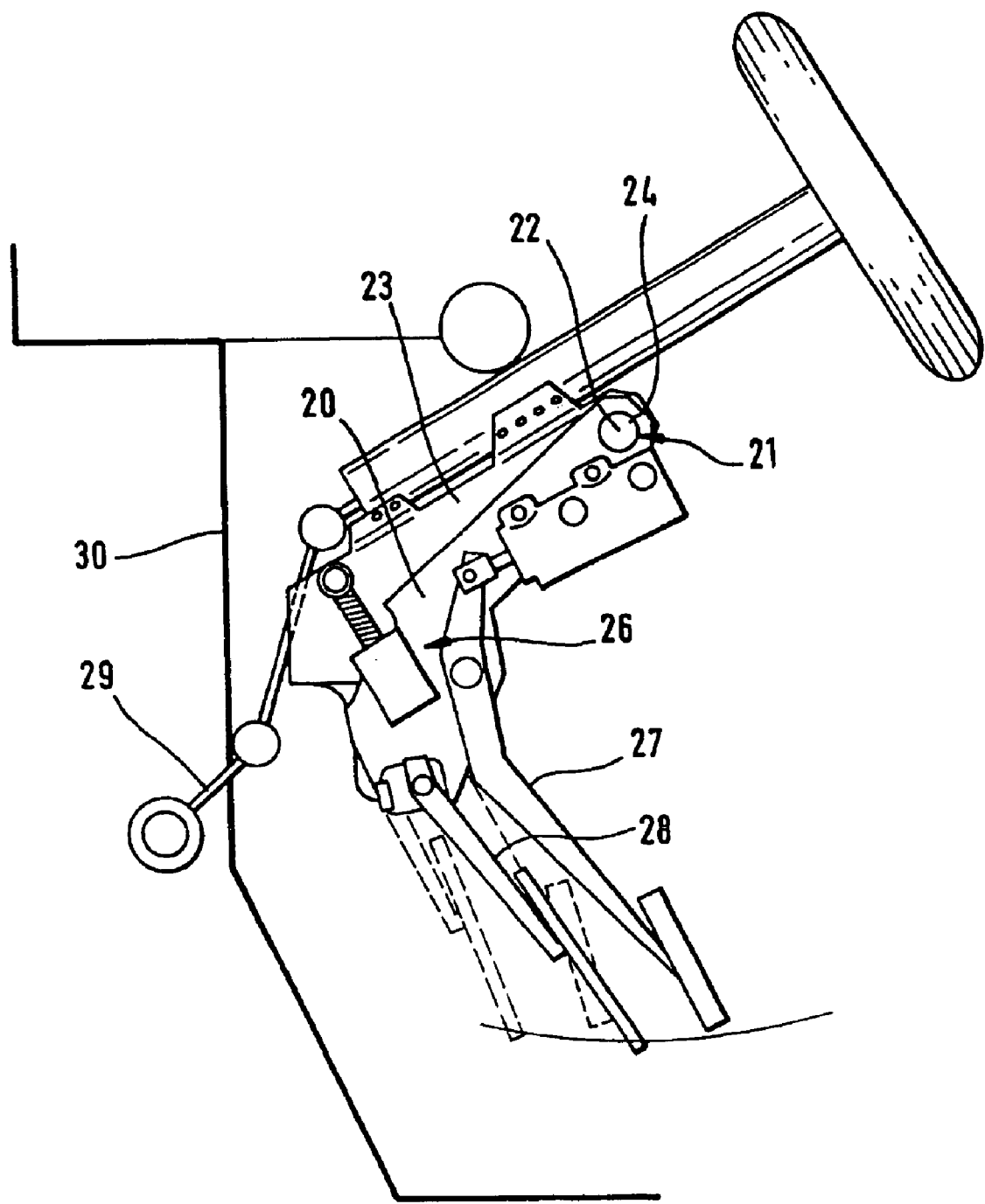
FIG. 3 shows a schematic view of an embodiment of a second actuation device.
Figure 4:
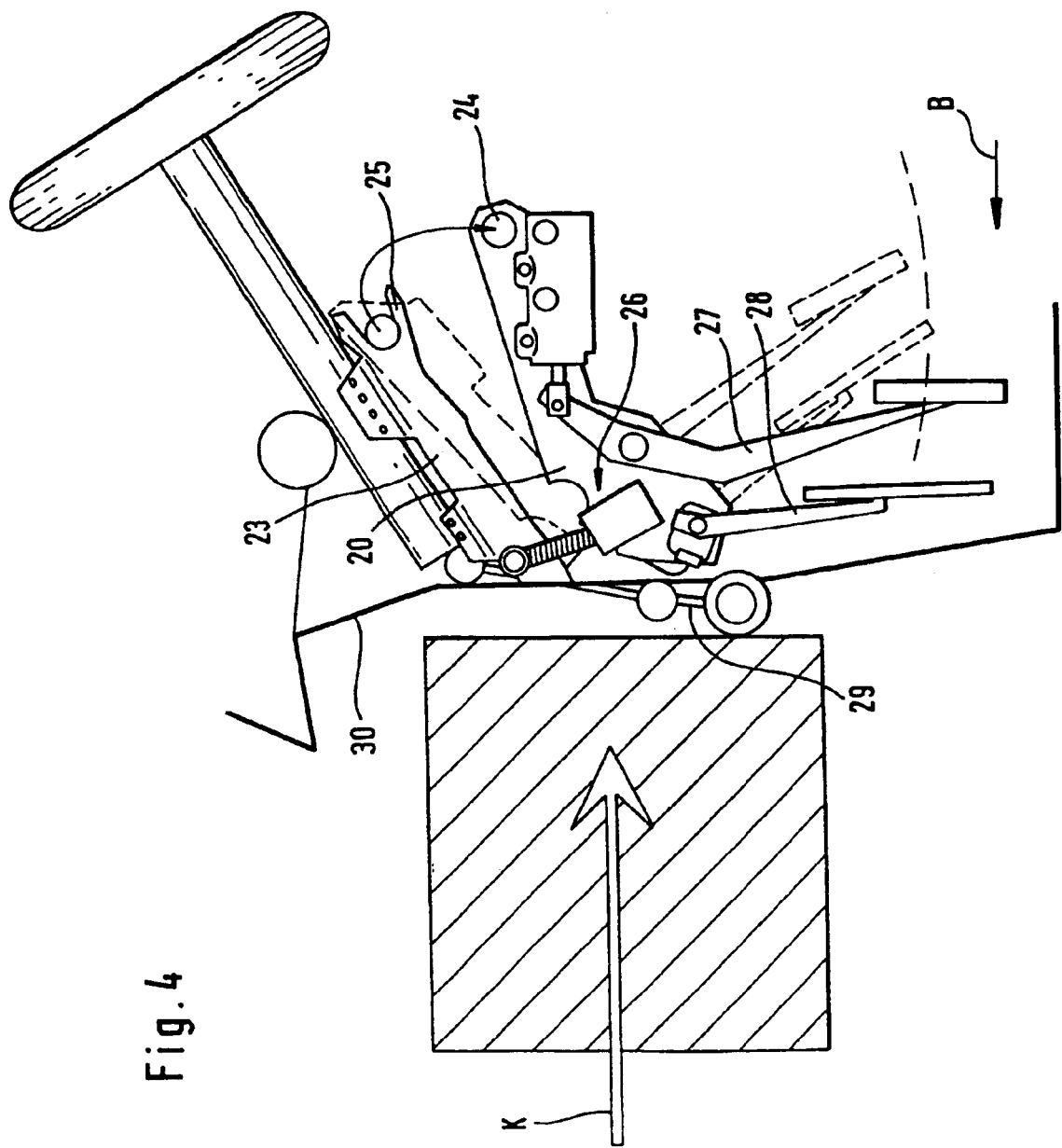
FIG. 4 depicts the same actuation device after a major collision with a deformation of the vehicle compartment in a greatly simplified sketch.

Another embodiment of the present invention related to a particularly compact design can-be seen in FIGS. 3 and 4. The details which have been described hereinabove with respect to the adjustment device 7 and said's actuation can be transferred to this embodiment. A base member 20 is articulated at a pedal stand 23 that can be mounted fast with the vehicle by means of bearing elements 21 about an imaginary axis 22. The axis 22 principally corresponds to the pivot axis of the abovedescribed actuation device (FIGS. 1 and 2) and might be formed e.g. by a pin, bolt, or any similar member, which is arranged at the base member 20 or the pedal stand 23. A bearing eye 25 which is to be arranged on either the pedal stand 23 or the base member 20 is used to support a bolt 24. Spaced from the axis 22 is an adjustment device 26 which is interposed between the pedal stand 23 and the base member 20 and by which swivelling about the axis 22 can be performed due to extending or shortening corresponding adjusting means. The said Figure primarily shows the rearward end position, with the front adjustment end position of the pedal levers 27, 28 being shown in dotted lines. Consequently, the base member 20 is pivoted on the pedal stand 23 for adjustment by means of the adjustment device 26.

Insofar the device is still identical to the solution according to FIGS. 1 and 2. However, a particularly compact construction is achieved because the base member 20 and the pedal stand 23 are arranged in parallel to each other or at least at an acute angle in relation to each other, with the pedal stand 23 being arranged beneath a steering axis and at the said. An enhanced collision safety is achieved because the frontal deformation of the vehicle compartment brings an end to the articulation of the base member, 20 at the pedal stand 23, and the base member 20 along with at least one pedal lever 27, 28 mounted thereon is fitted to the pedal stand 23 so as to be swivelling about another axis.

FIG. 4 illustrates in this connection principally the deformations which occur after a major impact in the area of a firewall (splashboard) 30 of a vehicle compartment, whereby a component part (such as an engine block, axle, foreign body, or similar elements) is moved in the direction of force K into abutment on the torque transmission means 29. The other, new axis of the base member 20 is defined by a point of articulation of the adjustment device 26 at the pedal stand 23. According to the embodiment, the bearing means 21 (bearing eye 25, bolt) are unlatched due to displacement of the pedal stand 23 and the base member 20 in relation to each other. It is advisable when the bearing eye 25 is designed to be partly open in the way of a claw, or when a closed bearing eye 25 tears off along a predetermined nominal breaking point due to the relative displacement so that the articulation can be released. For example, an active displacement of the base member 20 including the bolt takes place in the direction of the driver so that the bolt, as is illustrated in FIG. 4, is unhinged from the claw. Of course, other equivalently active arrangements are also feasible with respect to the bearing means 21, without departing from the present invention.

It is further advantageous that a torque transmission means or torque deviation means 29 is provided which deviates a force which does not act in the direction of actuation into the direction of actuation and transmits it onto the pedal stand 23 or the base member 20 so that the articulation of the base member 20 at the pedal stand 23 is releasable due to relative displacement. More specifically, the force effect K that originates from a movement of a component part in the direction of the driver is deviated into a direction of actuation B so that there occurs a relative displacement between the base member 20 and the pedal stand 23 which causes unlatching of the first point of articulation. This allows a swivelling movement of the base member 20 that is decoupled (from the original adjustment axis) together with the pedals 27, 28 (about a new swivelling axis) in the direction of the front part of the vehicle, which is a safer position. It is self explanatory that all features relating to the adjustment device 26 of the first solution (FIGS. 1 and 2) can be transferred to the second solution (FIGS. 3 and 4).

At least one pedal lever articulated to a base member was partly referred to in the above description. Of course, the present invention can be transferred to several pedals which are combined in one single pedal assembly. The present invention is appropriate especially for combinations of engine control pedals and brake pedals, or for combinations of engine control, clutch, and brake, wherein one or more brake pedals inhere the features of the present invention and are adjustable separately of each other or jointly.

What is claimed is:

1. An actuation device for a motor vehicle, comprising:
 a pedal stand mounted to said vehicle, said pedal stand including a base member pivotally attached to a first axis by an adjustable means for fixation,
 a housing for a generator,
 a pedal lever, pivotally attached to said base member,
 wherein said pedal lever and said generator are operatively coupled to one another and jointly swivel in relation to said pedal stand, and
 wherein said pedal lever further includes first and second legs, wherein a pressure is asserted on said first leg causing said second leg to act on said generator.

2. An actuation device as in claim 1, wherein said pedal lever includes a means for torque transmission, said means for torque transmission deviates a force towards said interior of said vehicle, and said means for torque transmission operatively engages said pedal lever in a swiveling movement.

3. An actuation device as in claim 1, wherein said pedal lever includes a means for torque transmission, said means for torque transmission operatively engages said pedal lever in a swiveling movement such that said pedal lever initiates a brake actuation independent of a driver in the case of a vehicle deformation.

4. An actuation device as in claim 1, wherein said first leg of said pedal lever includes a foot actuation part, said second leg of said pedal lever includes a point of articulation at which an actuating member for the generator is secured, said second leg of said pedal lever further includes a baffle head, said baffle head contacts a component of said vehicle in a force-transmitting contact in the event of a vehicle deformation earlier than said first leg contacts said component of said vehicle.

5. An actuation device as in claim 1, wherein said first and second legs are diametrically opposed.

6. An actuation device as in claim 1 wherein said adjustable means for fixation includes a threaded spindle-and-nut arrangement, said threaded spindle-and-nut arrangement permits a determinable swiveling movement of said base member in relation to said pedal stand such that the position of said pedal lever in relation to said generator is maintained.

7. An actuation device as in claim 1, wherein said adjustable means for fixation includes an electric motor, said electric motor is connected to a control unit by means of a bus link, said control unit includes a memory module unit for storing adjustment positions.

8. An actuation device as in claim 7, wherein said control unit and said memory module are a part of a control unit for an electronically controlled vehicle brake system.

* * * * *